Figure 1:
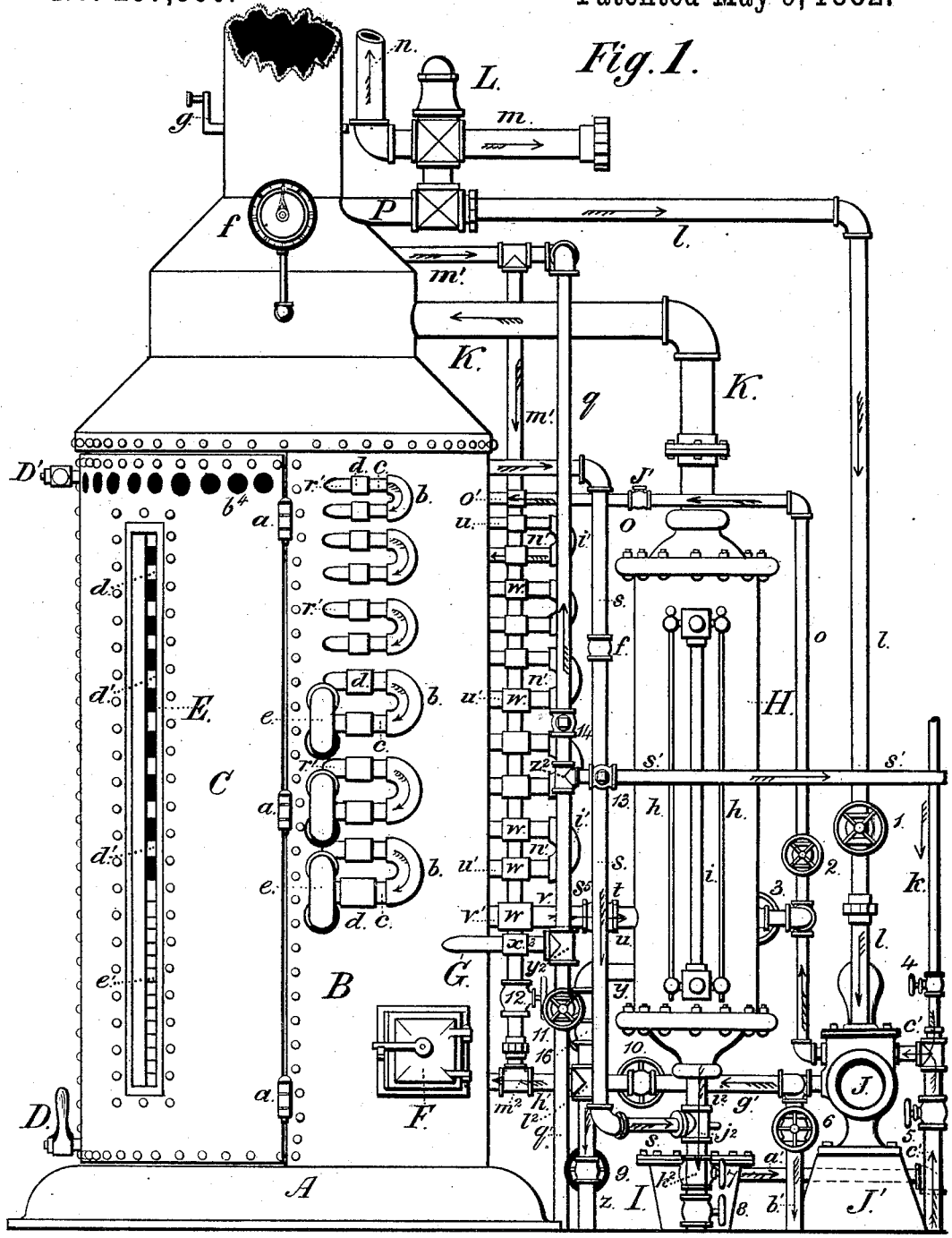

(No Model.) 16 Sheets—Sheet 1.

W. F. BROWNE.
PROCESS OF AND APPARATUS FOR GENERATING GASES FOR MOTIVE POWER, HEATING, AND ILLUMINATING PURPOSES.

No. 257,550. Patented May 9, 1882.

WITNESSES:
E. A. Legrand
J. H. Cité

INVENTOR
Wm. Frank Browne (No Model.)

W. F. BROWNE.

PROCESS OF AND APPARATUS FOR GENERATING GASES FOR MOTIVE POWER, HEATING, AND ILLUMINATING PURPOSES.

No. 257,550. Patented May 9, 1882.

16 Sheets—Sheet 3.

WITNESSES:

INVENTOR

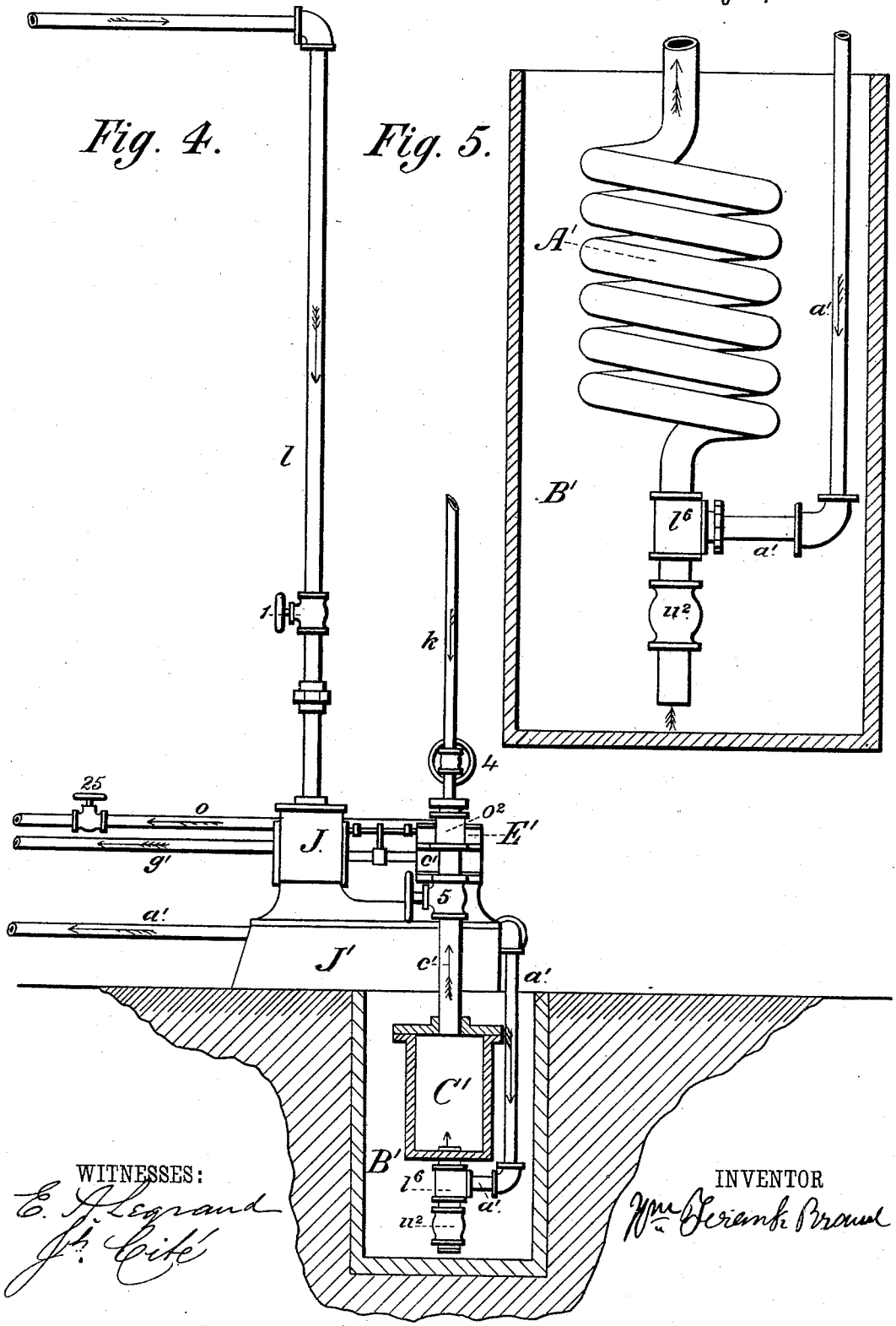

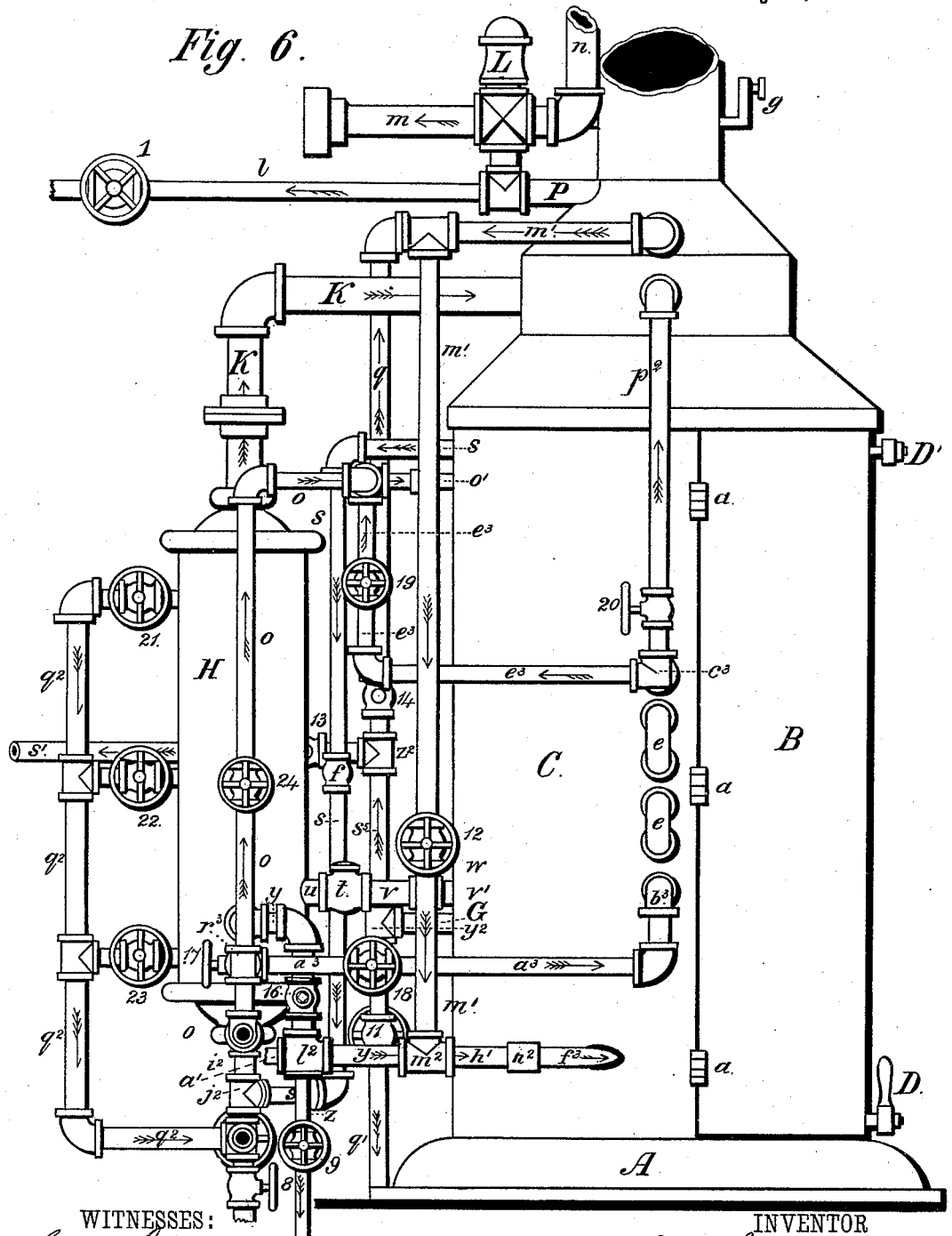

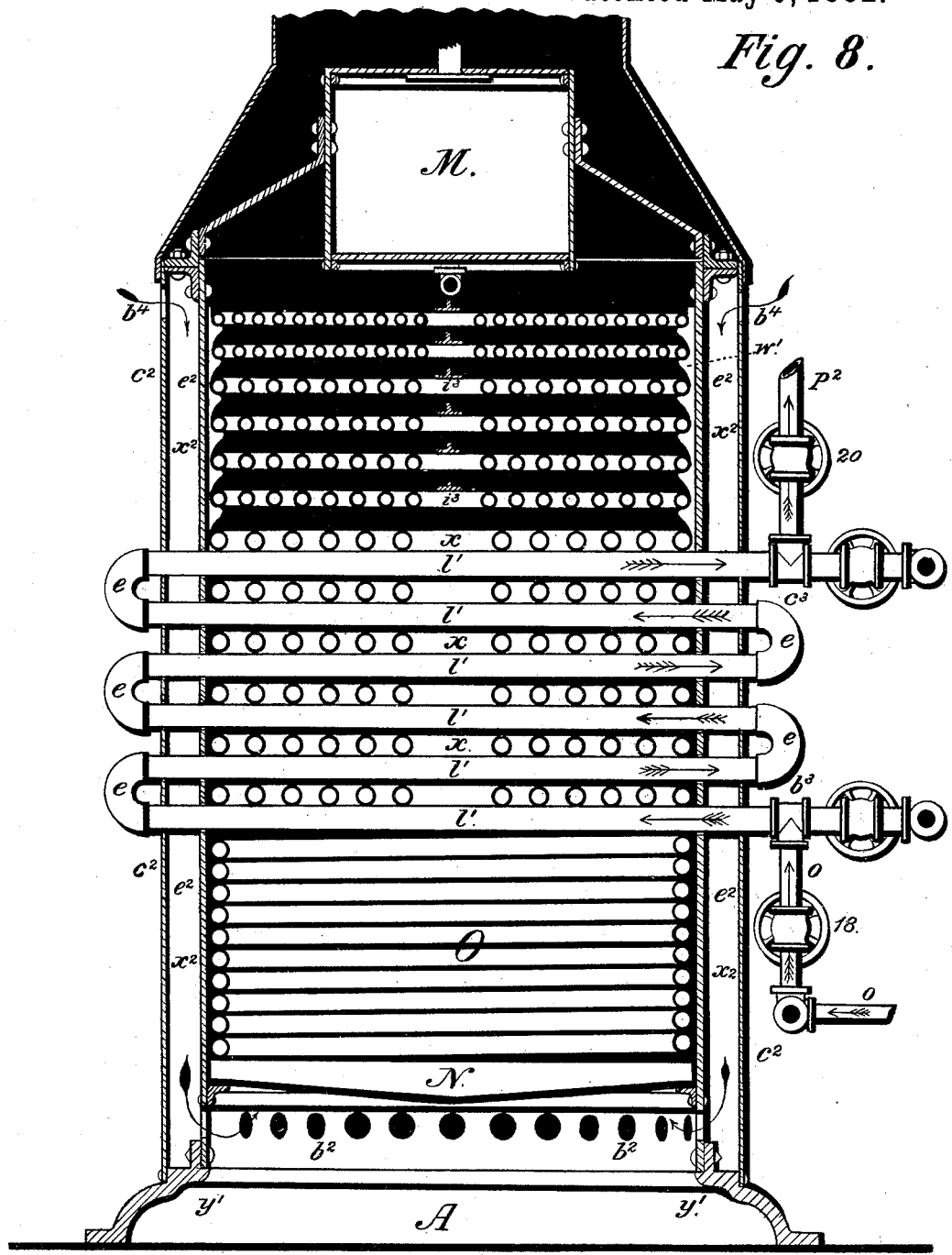

(No Model.)
16 Sheets—Sheet 8.
W. F. BROWNE.
PROCESS OF AND APPARATUS FOR GENERATING GASES FOR MOTIVE POWER, HEATING, AND ILLUMINATING PURPOSES.
No. 257,550.   Patented May 9, 1882.
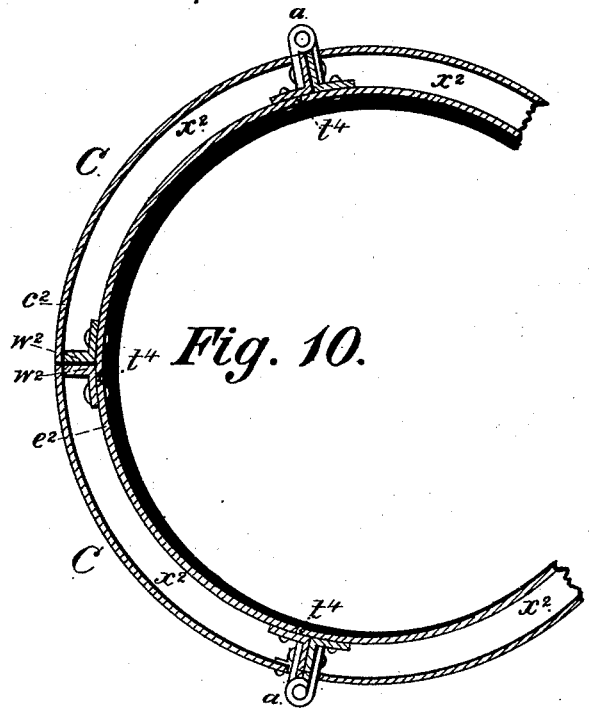
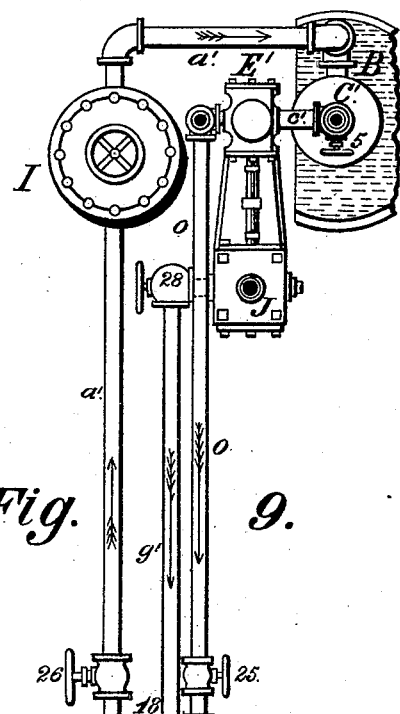
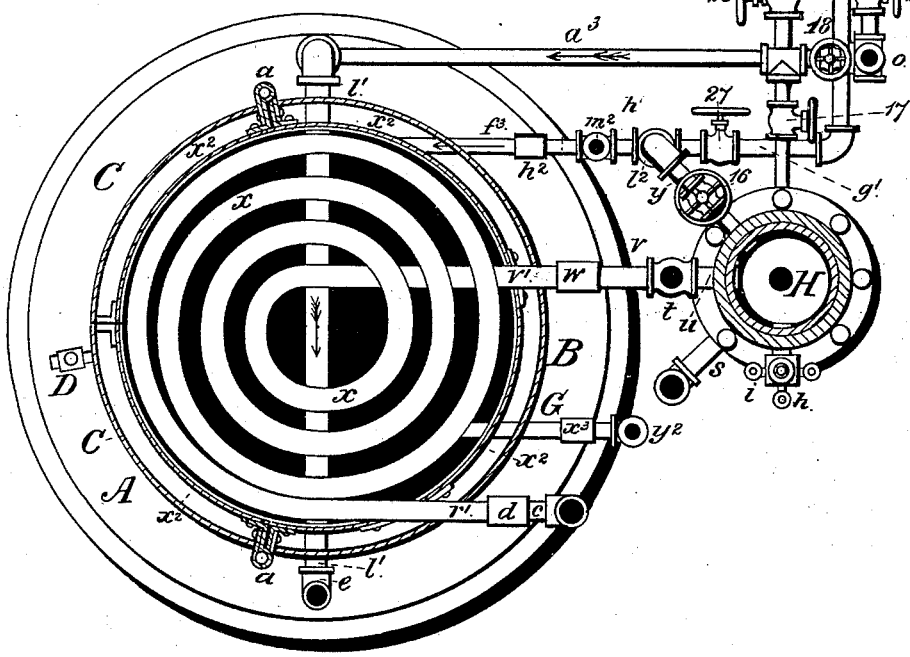

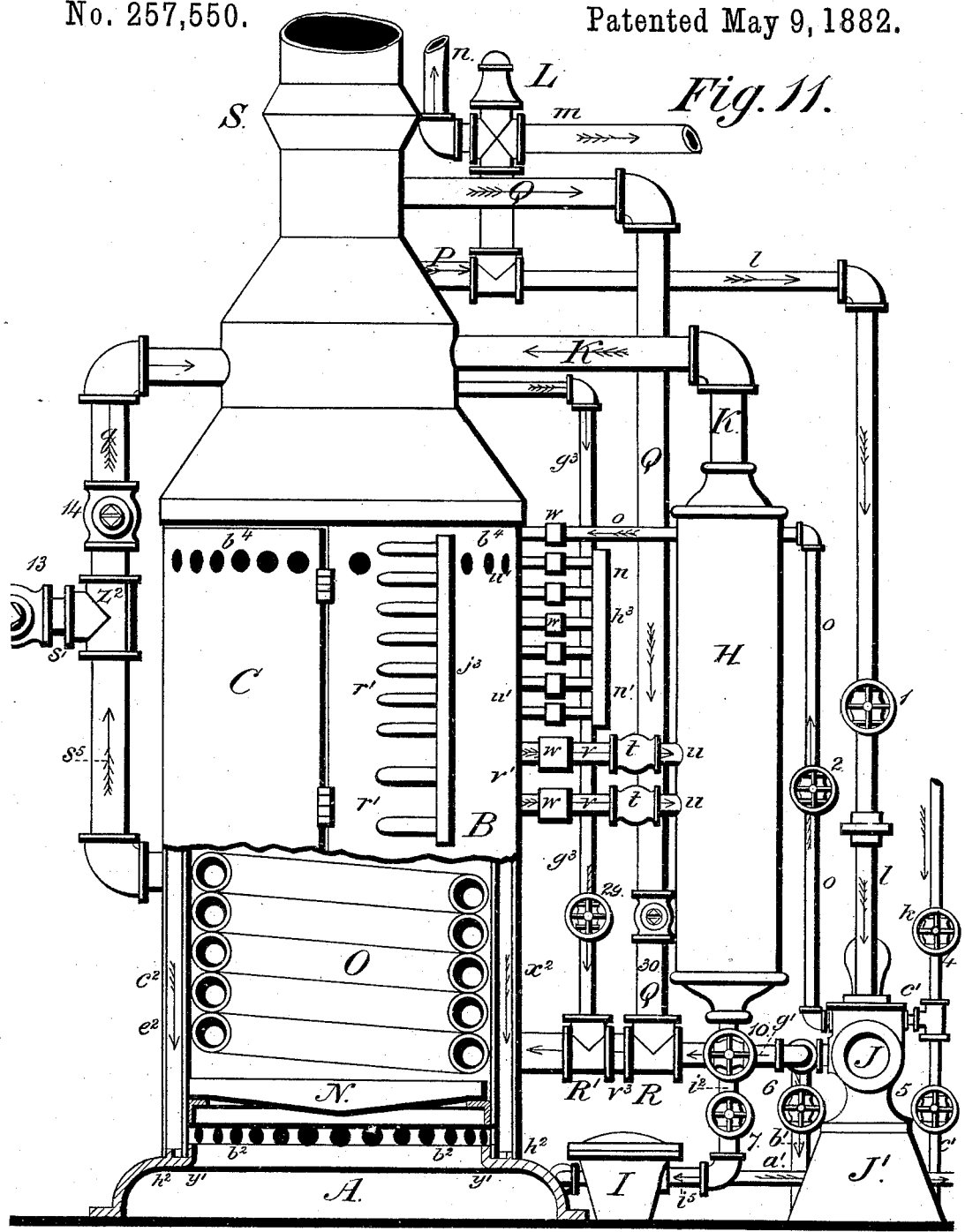

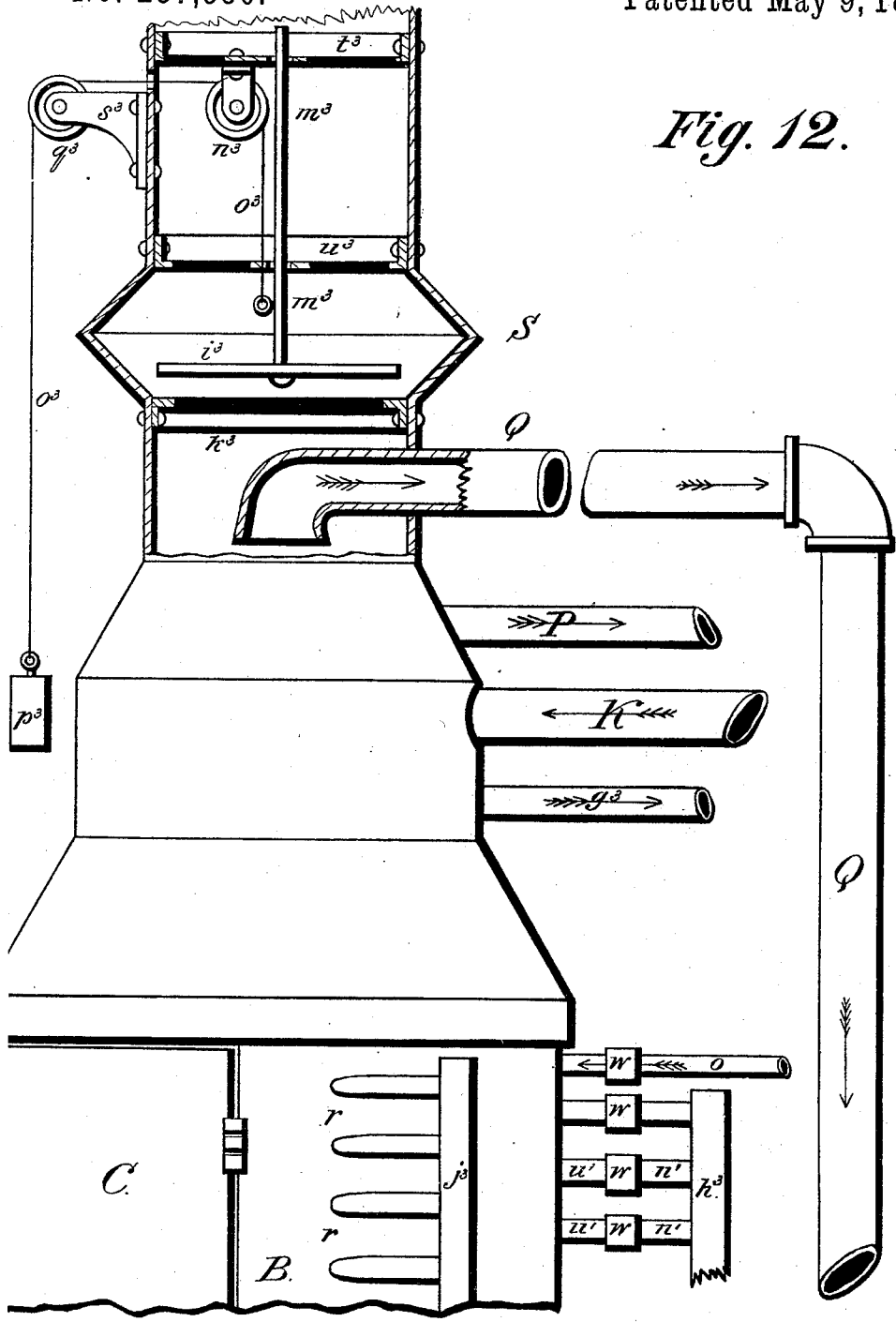

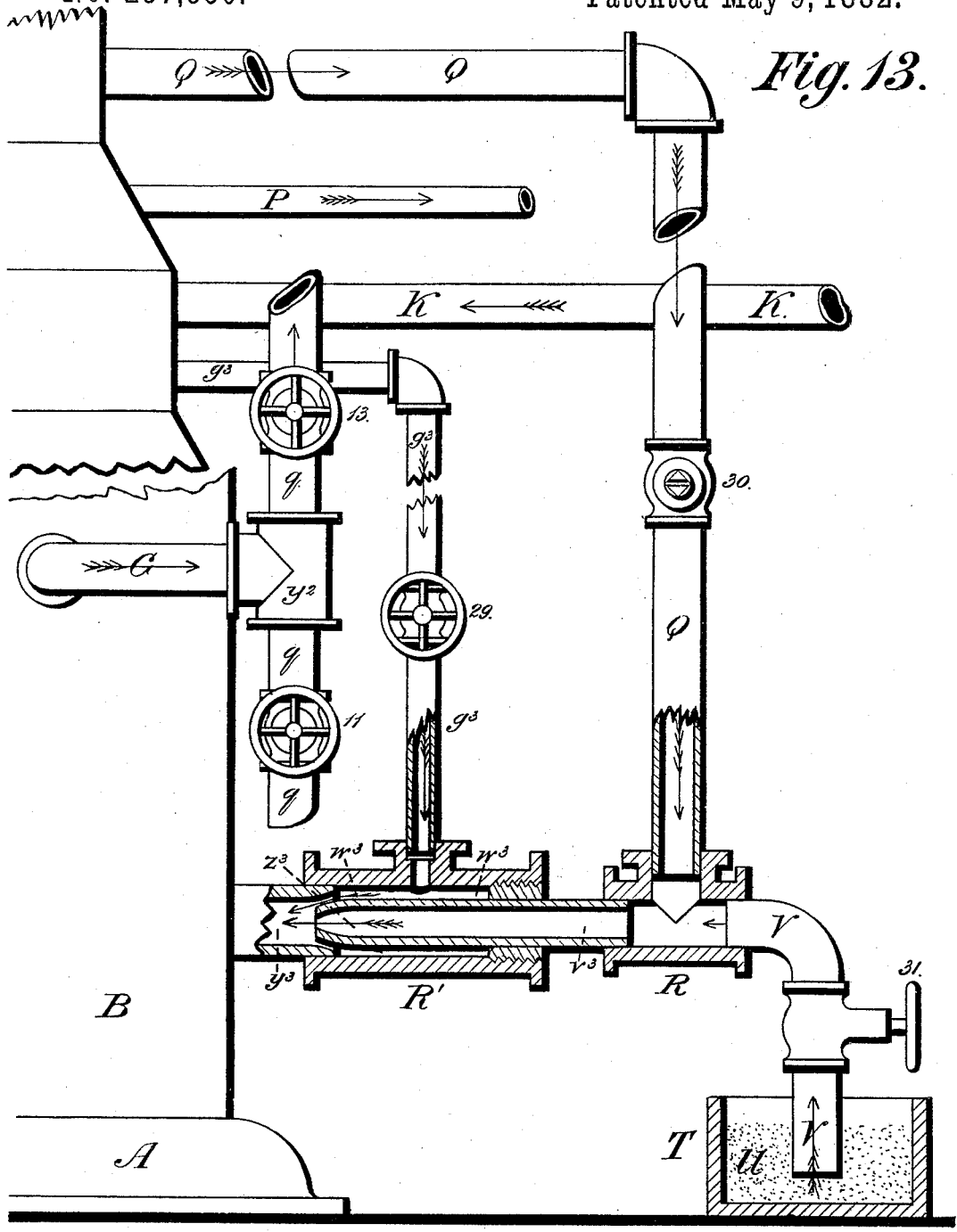

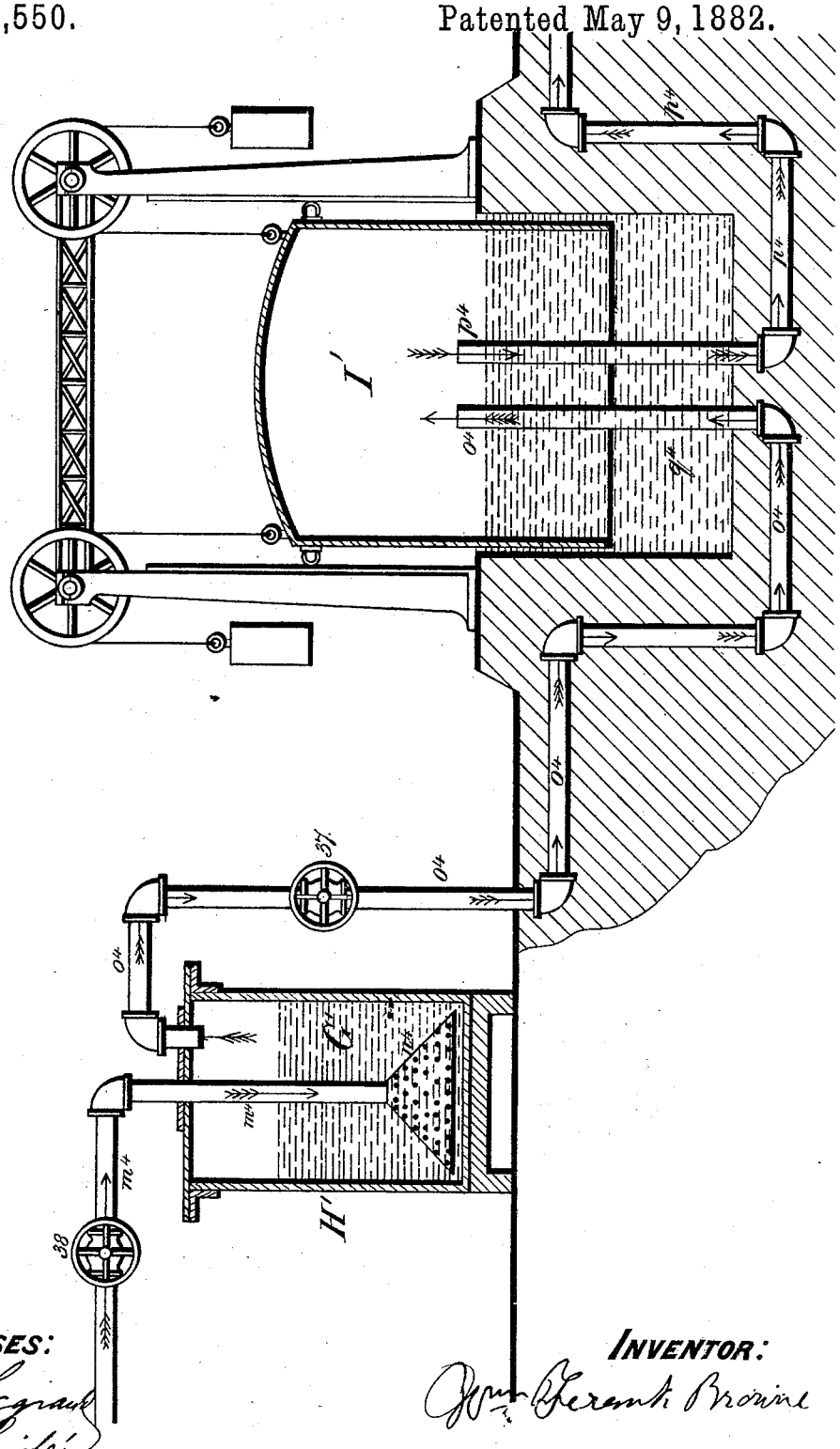

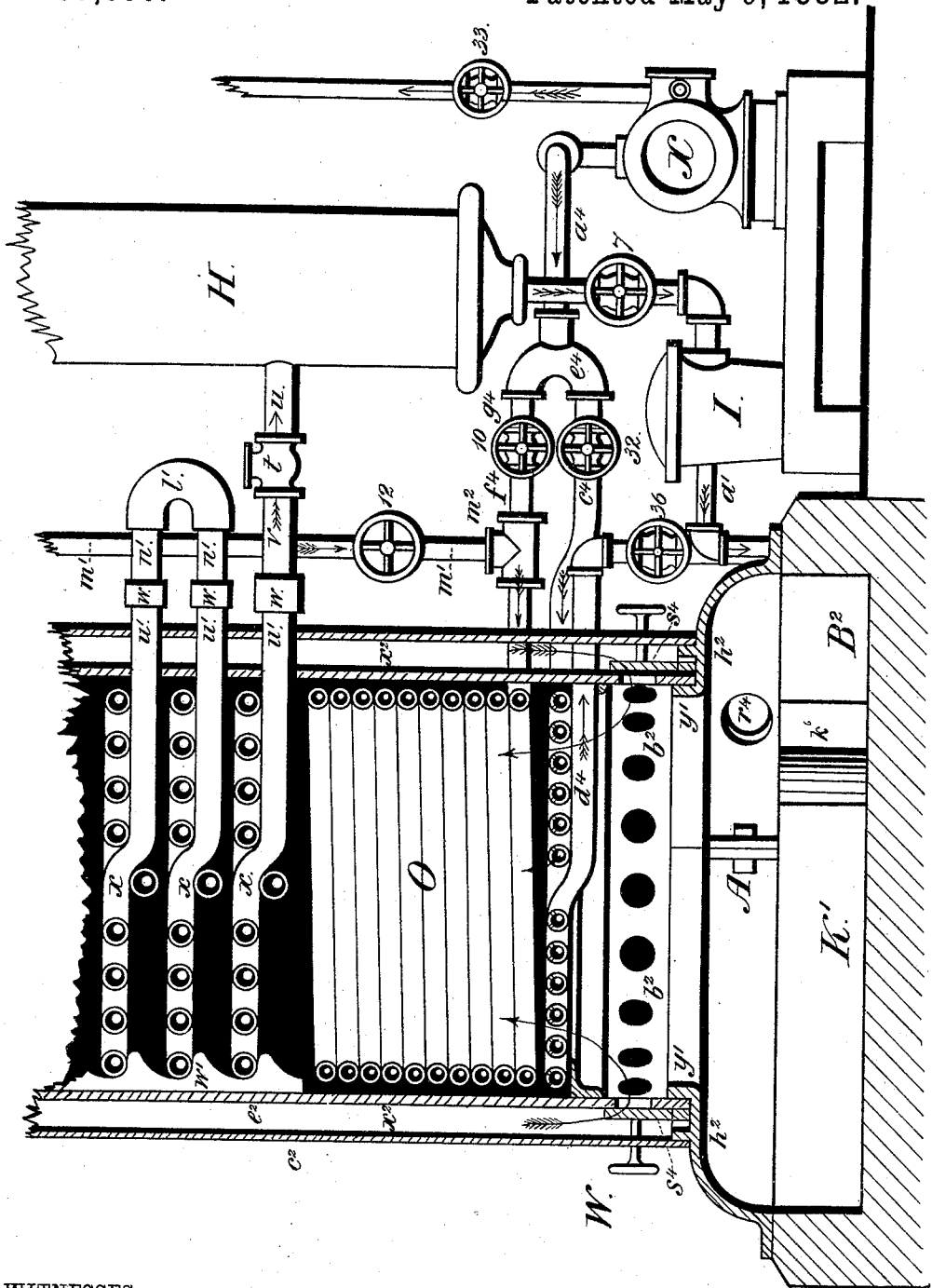

(No Model.)  16 Sheets—Sheet 14.
W. F. BROWNE.
PROCESS OF AND APPARATUS FOR GENERATING GASES FOR MOTIVE POWER, HEATING, AND ILLUMINATING PURPOSES.
No. 257,550.  Patented May 9, 1882.
Fig. 16.
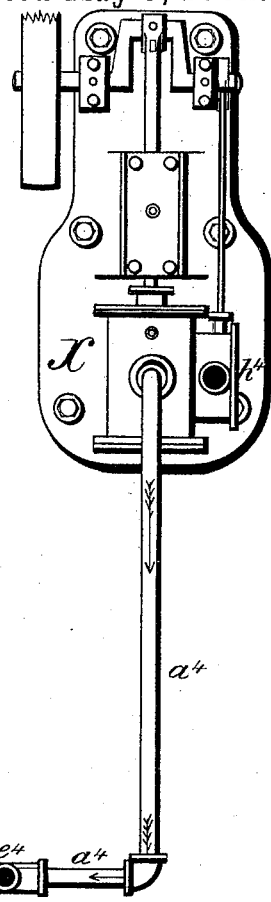
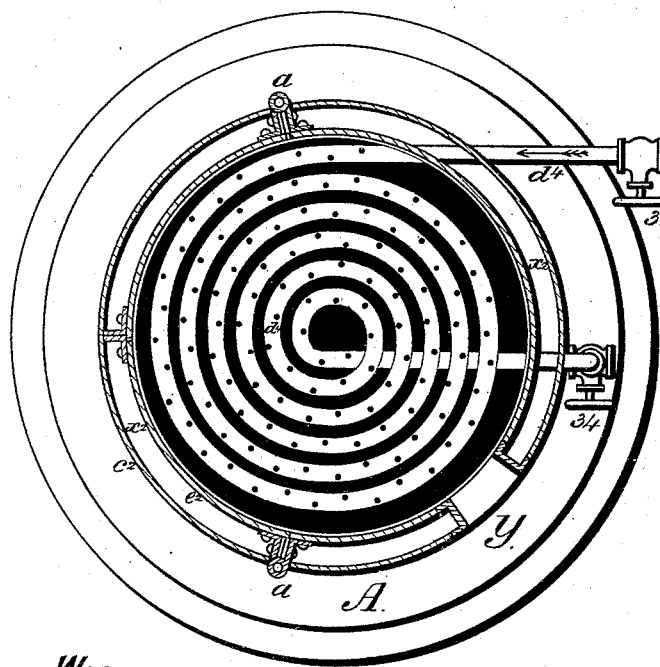
WITNESSES:
INVENTOR:
Wm Frank Browne.

(No Model.)  W. F. BROWNE.  16 Sheets—Sheet 15.
PROCESS OF AND APPARATUS FOR GENERATING GASES FOR MOTIVE
POWER, HEATING, AND ILLUMINATING PURPOSES.
No. 257,550.  Patented May 9, 1882.

WITNESSES:  INVENTOR

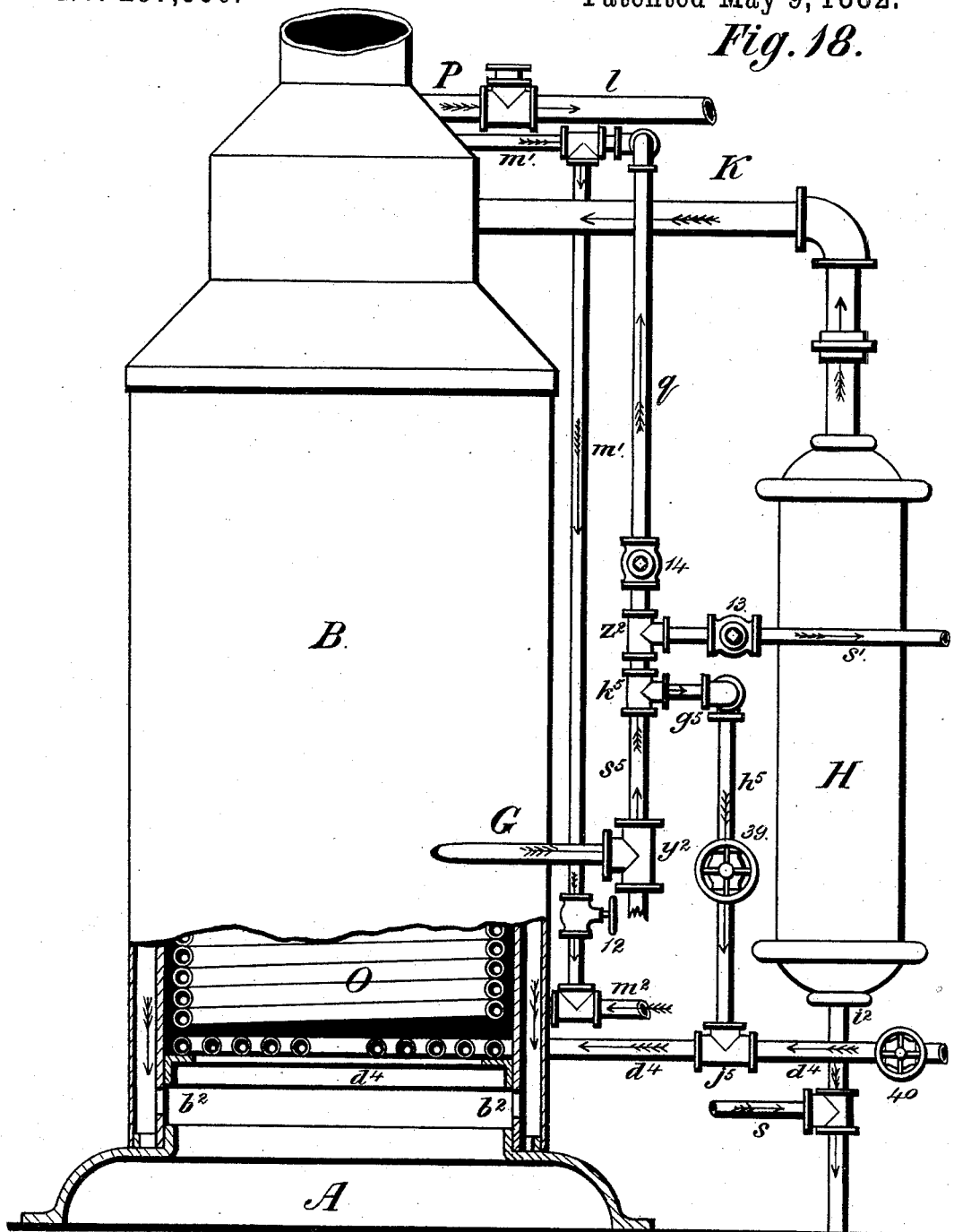

UNITED STATES PATENT OFFICE.

WILLIAM FRANK BROWNE, OF NEW YORK, N. Y.

PROCESS OF AND APPARATUS FOR GENERATING GASES FOR MOTIVE POWER, HEATING, AND ILLUMINATING PURPOSES.

SPECIFICATION forming part of Letters Patent No. 257,550, dated May 9, 1882.

Application filed August 16, 1881. (No model.)

*To all whom it may concern:*

Be it known that I, WILLIAM FRANK BROWNE, of the city, county, and State of New York, have invented an Improved Mode or Process of and Apparatus for Generating Gases for Motive Power, Heating, and Illuminating Purposes; and I do hereby declare the following to be a clear and full description thereof, reference being had to the accompanying drawings, which form a part of this specification.

This invention relates to a new mode or process and the means for generating gases under high or low pressure for motive power, heating, and illuminating purposes.

The invention consists, first, in the construction and arrangement of suitable conduits, through which the liquids or substances from which gas is generated are forced; second, in the construction of the double shell or casing in which the conduits are inclosed; third, in the construction and arrangement of two doors, which embrace nearly one-half of the casing or shell; fourth, in the arrangement of a series of supporting-bars, consisting of suitable pipes or tubing beneath the sectional conduits, said pipes or tubing being connected at their ends by suitable fittings for the purpose of conducting liquids through the series, whereby the bars are enabled to withstand the heat arising from the furnace; fifth, in the means for conducting the exhaust gas or vapor from an engine to a superheating-coil, wherein the said gas or vapor is converted to a fixed gas; sixth, in the means for circulating liquids through the superheating-conduit when not employed in making gas; seventh, in the means and arrangement for circulating liquids through the supporting-bars when not forced through by a pump or injector, or their equivalents, while under pressure; eighth, in the mode and means for returning the liquids which are trapped off from the generator to the pump, and from thence into said generator; ninth, in combining or connecting a series of flat conduits located in a shell, casing, or stack, one above another, by suitable end connections, whereby a free circulation of liquid throughout the entire length of the series of conduits is attained; tenth, in spiral conduits the ends of which project tangentially to the inner and outer turn, and parallel, or nearly so, to each other, and through the shell or casing which incloses them, whereby no jointed connections occur within the shell; eleventh, in locating the spiral conduits within the shell in such manner that the ends of the conduits projecting from the inner turns and through the shell will support the coils which rest thereon; twelfth, in conducting the draft from the top of the shell down between the outer and inner casing thereof beneath the grate-bars, and thence through apertures in the inner shell into the ash-pit, whereby the air becomes heated before coming in contact with the fuel; thirteenth, in the arrangement of two pipes in connection with a pump, whereby hydro, carbonaceous, or hydrocarbonaceous liquids and aqueous matter are conducted to a pump and forced therefrom into a suitable heating device, wherein the injected products are converted to vapor or gas for motive power, heating, or illuminating purposes; fourteenth, in the process of conducting the products of combustion into a superheater and combining therewith superheated steam and the products of petroleum or solid carbonaceous matter in a granulated or powdered form, whereby the resultant gas generated therein can be utilized for heating or illuminating purposes; fifteenth, in the process of at first converting the products of petroleum into vapor or gas and then combining therewith the products of combustion in a suitable heating device, wherein the products may be combined and converted into a fixed gas and subsequently purified, or the gas, with or without fixation, can be run into heating-furnaces for immediate use; sixteenth, in the arrangement and means for conducting the products of combustion into a heating device, wherein said products, in combination with carbonaceous or hydrocarbonaceous matter, are decomposed and recomposed, forming a heating or illuminating gas; seventeenth, in the arrangement of means for forcing solid carbon by a jet of steam, gas, or vapor into a suitable heating device, wherein a decomposition and recomposition of the matter is obtained, whereby a fixed gas is evolved therefrom for heating or illuminating purposes; eighteenth, in the process of forcing steam or steam charged with hydrocarbon vapor or a gas formed from said steam and vapor and the products of combustion into a receiver containing combustible liquids, wherein the said products commingle, and are discharged therefrom into suitable heating-furnaces and therein burned, or through a superheating device, where a fixed gas is formed, from thence into a gas-holder for subsequent use; nineteenth, in the process of injecting or forcing the products of combustion into heated coils or conduits, or into any other suitable device or devices, by means of a steam-jet combined with carbon or hydrocarbon vapor or gas, whereby said products of combustion are decomposed and recomposed with said steam and carbon or hydrocarbon vapors or gas, and are fixed therein and made inflammable thereby and ready for all classes of furnaces, or when sufficiently carbureted they may be stored in a gas-holder for subsequent use; twentieth, in a grate consisting of pipe or tubing containing perforations for the eduction of combustible gases derived from the exhaust of an engine which is worked or driven by gas or steam and vapor from liquid combustibles; twenty-first, in a grate consisting of pipe or tubing which is perforated for the eduction of gas or combustible vapor derived from a gas-generator; twenty-second, in the combination of the exhaust-ports and pipe of an engine with a hollow perforated grate-bar.

Figure 2:
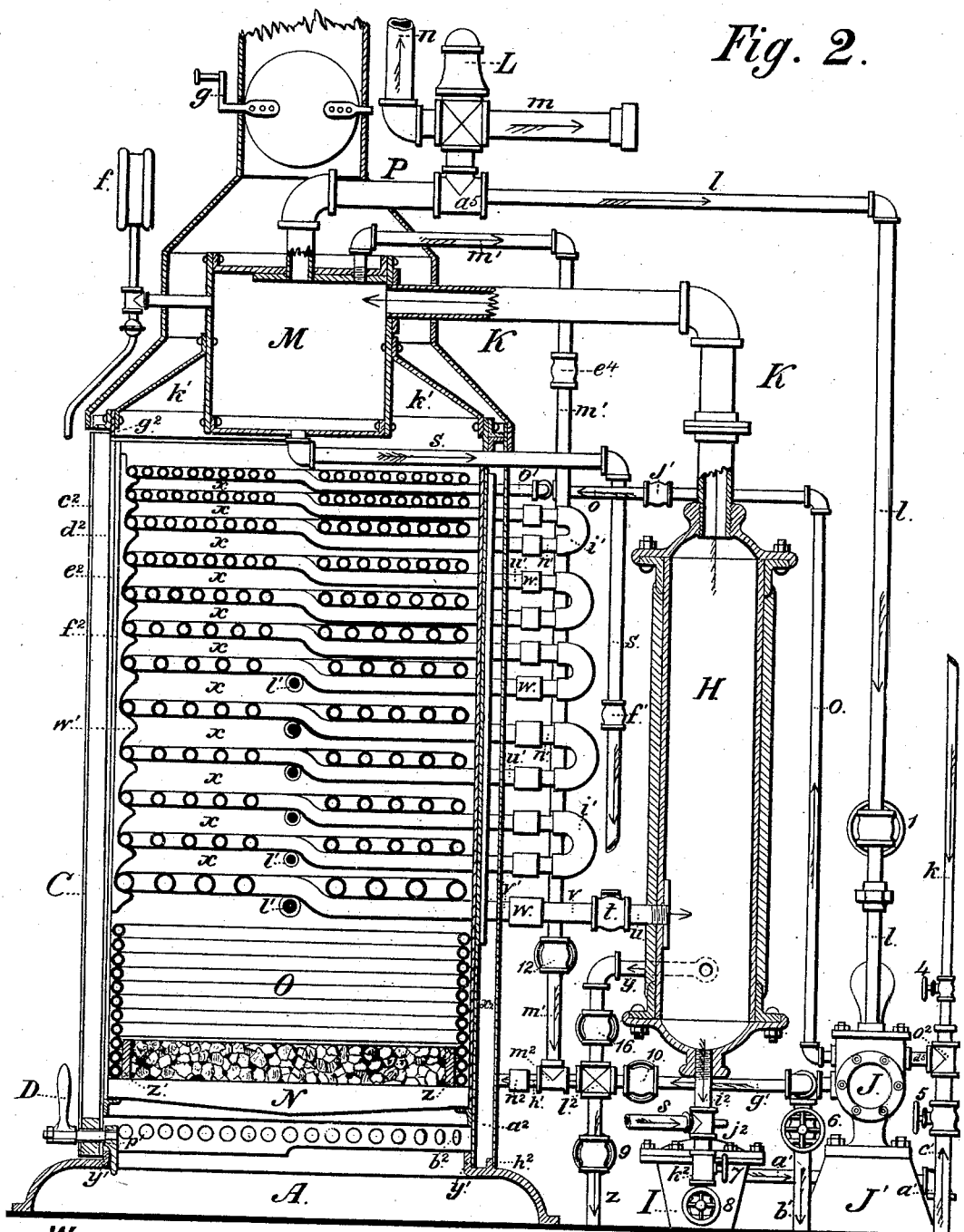
Figure 3:
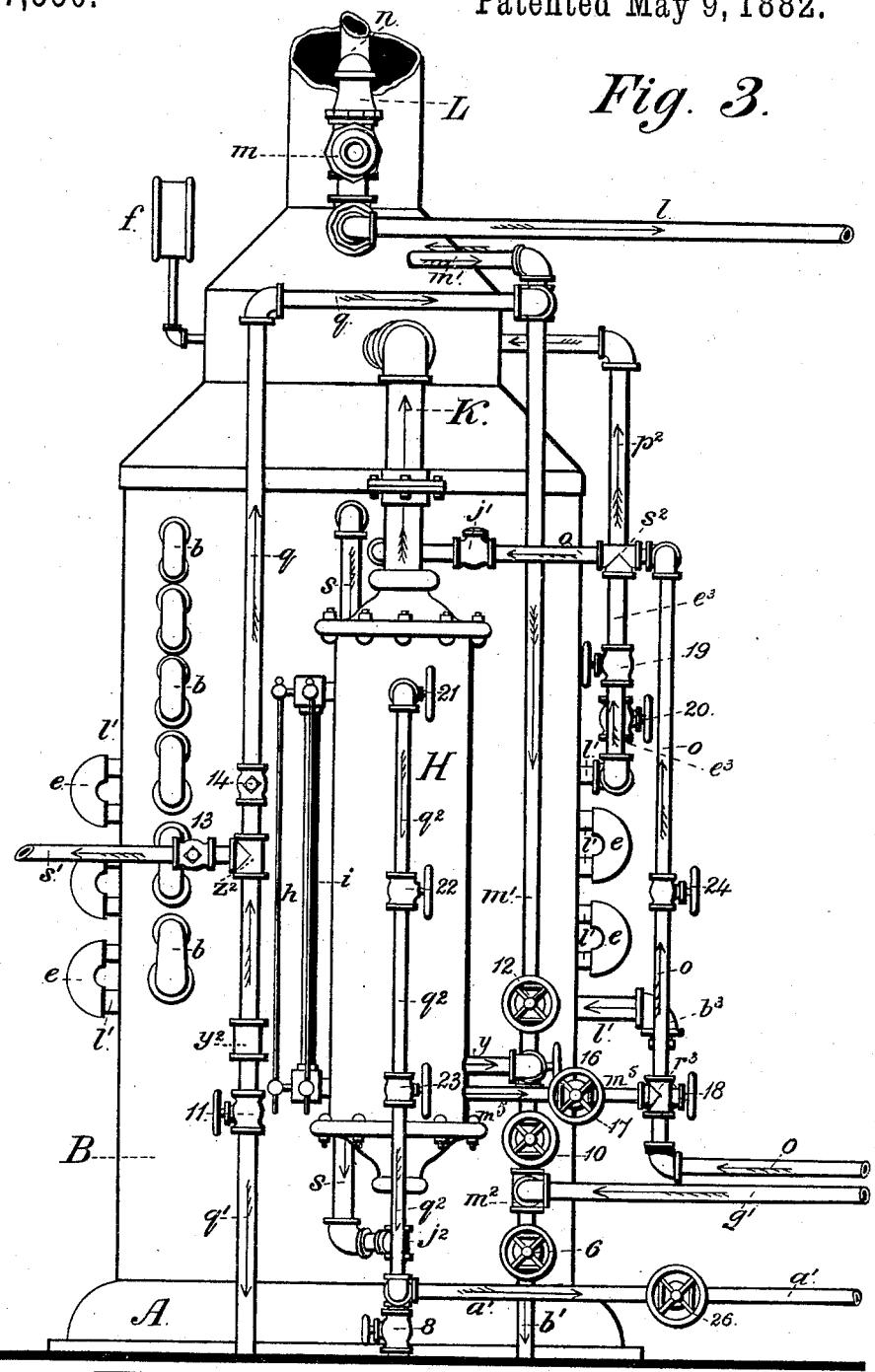
Figure 7:
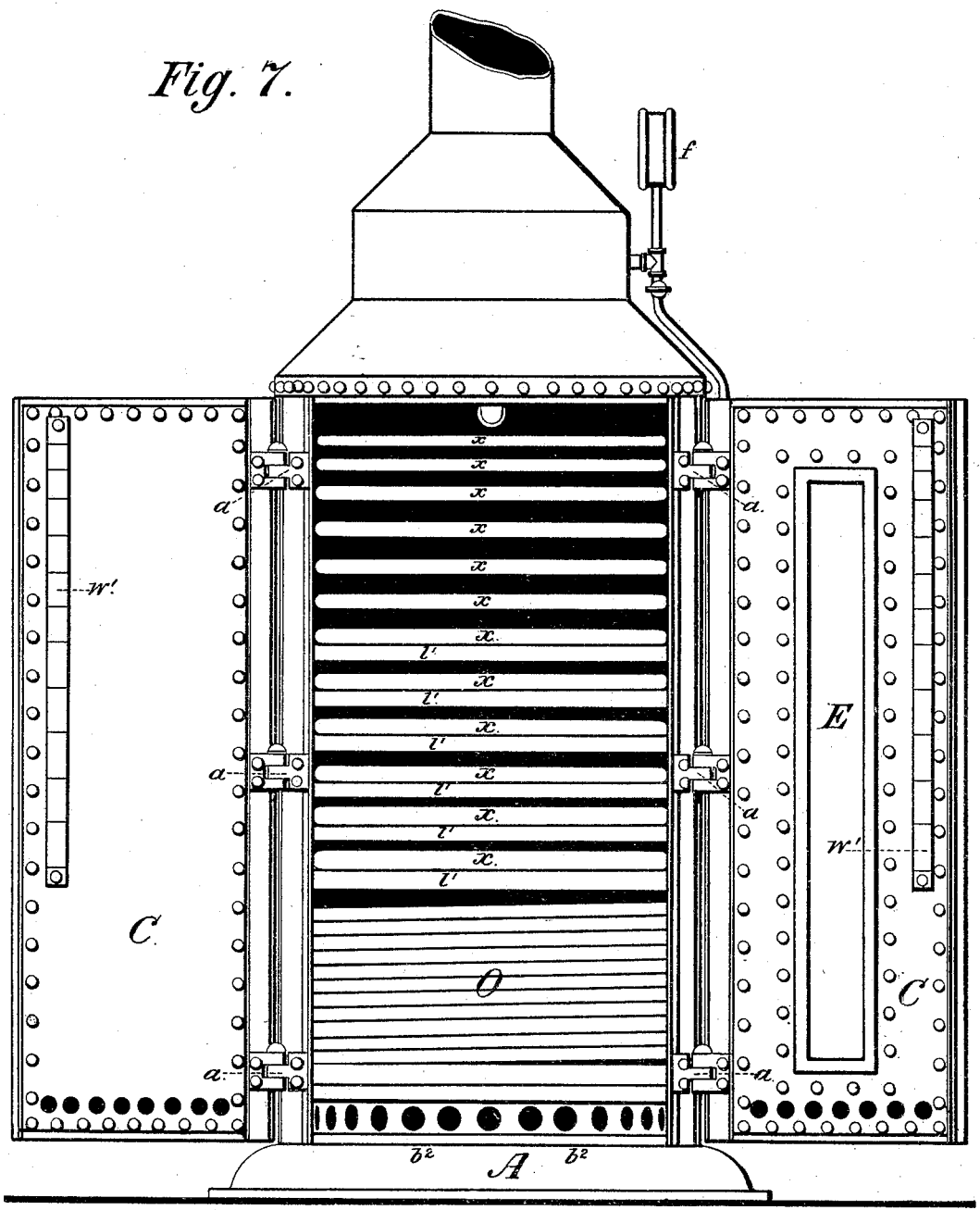
Figure 17:
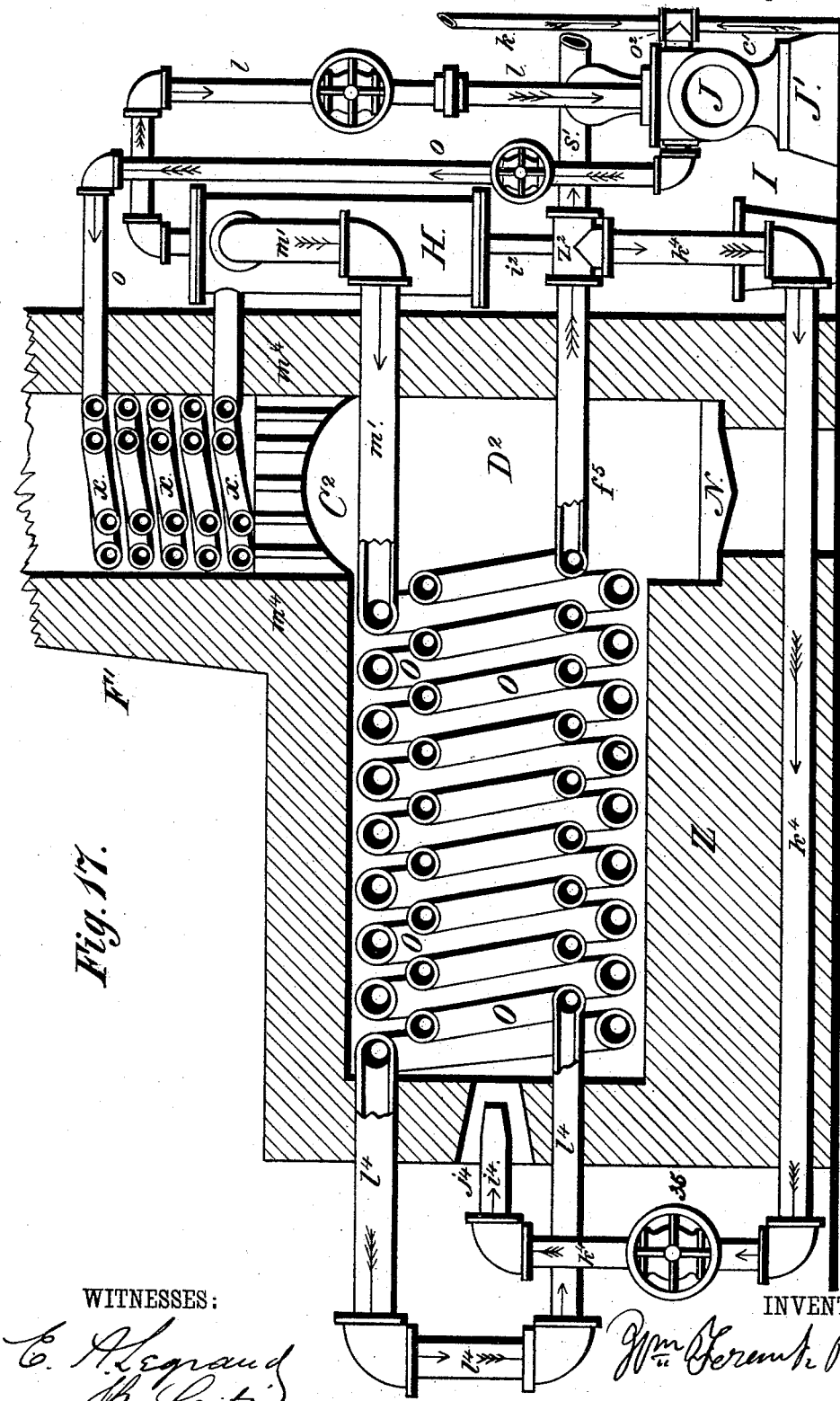

Figure 1 is the right-hand side elevation of a steam and gas generator. Fig. 2 is a vertical central section of Fig. 1. Figs. 3 and 4 show a rear elevation of the steam and gas generator, showing the connection with the pump and trapping device, in connection with device for returning condensation to the generator. Fig. 5 is a modification of the device for returning hot liquids to the generator. Fig. 6 is the left-hand side elevation of the generator, showing the pipe-connections therewith. Fig. 7 is a front elevation of the generator with its two doors opened, whereby the conduits are shown. Fig. 8 is a vertical central section of the generator, showing the hollow supporting-bars and connecting-pipes for circulating liquids therein with or without the aid of a forcing or injecting device. Fig. 9 is a sectional plan of the generator and its separator or stand-pipe, showing the form and arrangement of one of the conduits, the outer and inner shell surrounding said conduit, and also a plan view of the steam-pump, trap, and connecting-pipes. Fig. 10 is an enlarged broken horizontal sectional view of the shell or case, showing the space between the outer and inner shells and the arrangement of the doors therewith. Fig. 11 is an elevation of the generator with the lower part of the shell broken away, thus revealing the superheater, and also showing the conductor for conducting the products of combustion to said superheater. Fig. 12 is a detailed view, showing a balanced or weighted controlling valve for controlling the current of the products of combustion and letting escape the surplus products not taken away by the conductor. Fig. 13 is a broken elevation of the generator and sectional view of a device for forcing the products of combustion into a heating device, wherein said products are mingled with carbonaceous or other suitable matter and evolved into a fixed gas for either heating or illuminating purposes, and also a sectional view of a receiver for holding powdered carbonaceous matter, which is forced or drawn to the injecting device, which forces it into the superheater, wherein it is converted to gas in combination with the injecting material. Fig. 14 is a vertical central section of a purifying apparatus and gas-holder which is attached to or connected with the gas-generating apparatus shown in Fig. 1. Fig. 15 is a vertical broken sectional view of the gas-generator, showing the connection formed between the exhaust of an engine and a hollow perforated grate-bar or bars. Fig. 16 is a sectional plan view, showing the hollow perforated grate bar and its connection with an engine. Fig. 17 is a vertical longitudinal section of a modification of the gas-generator shown in Fig. 1. Fig. 18 is an elevation of a high-pressure gas-generating apparatus, with the base or lower part shown in section for the purpose of showing the connection between the perforated grate and the supply-pipe for inducting gas from the generator to said perforated grate.

Similar letters of reference designate corresponding parts in all of the figures.

The base A, which is shown in the several figures, is made preferably of cast-iron, and when of large diameter or for transportation it should be made in two or more sections, with suitable flange-connections thereon, which, when put together, are held securely in place by suitable bolt-fastenings. The stationary portion of the shell B is mounted upon the base A and firmly secured thereto by bolts or rivets, and when the base is made in sections the shell portion B can be made to conform thereto and the parts or sections properly secured by any well-known mechanical device or devices.

One side or one section of the stationary part of the shell contains the feed-door F of the furnace. The remaining portion of the shell is divided into two doors, C, which swing upon the hinges a and are kept closed by the fastening devices D, D', and p', as shown in Figs. 1, 2, and 6. These devices will hold the upper and lower ends of the doors firmly in place, while the center can be held by a suitable clasp or other device should the heat within the shell be intense enough to spring them asunder. These doors constitute a very important feature of this invention. They embrace nearly one-half of the shell in diameter and height, and necessarily so, in order that the proper functions can be performed.

One of the doors is provided with a window, E, which extends nearly the length of the door. The frame of the window is made preferably of cast metal and riveted to the shell or casing of the door, and is provided with mica or suitable glass covering, through which the interior of the shell and the internal parts therein are observed.

The frames of the doors C are made from suitable angle-iron, either rolled from wrought-iron or made from cast metal. When made from cast metal the pattern can be formed with all of the necessary curvatures, projections, and rivet and bolt holes thereto. To this frame the outer and inner casing or metal, $c^2 e^2$, Figs. 2, 9, and 10, is riveted, thus forming a clear space, $x^2$, which extends from the top to the bottom of the body of the generator. The outer casing of metal is provided with holes $b^4$ at the top, while the inner casing of metal is provided with corresponding holes, $b^2$, at the bottom thereof. These holes are for the purpose of admitting the air at the top of the shell into the space $x^2$, where it becomes heated on its downward passage and is drawn through the bottom holes, $b^2$, into the ash-pit, and thence upward between the grate-bars, where in its heated condition it mingles with the fuel and supports the combustion thereof.

The draft can be accelerated by a jet of steam or air within the stack, or by suitable connections and devices arranged at the top of the shell, whereby air can be forced in and downward into the ash-pit, and thence upward, and also the air can be blown directly into the ash-pit K', as indicated in Fig. 15, at $r^4$. When blown in at $r^4$ the register $s^4$ should be closed, and again opened when the draft is taken in at the holes $b^4$. A register can also be used to regulate the draft at the top of the generator.

In the broken horizontal sectional view, Fig. 10, it will be observed that at the joint between the two doors C C the edge $t^4$ of the inner shell or casing laps over and covers the joint formed by the frame or angle-iron $w^2 w^2$, and also the edge $t^4$ of the inner shell, $e^2$, overlaps and covers the joints formed by the frame or angle-irons to which the hinges $a$ are secured. By this arrangement a tight or close joint is obtained. It will also be observed in Figs. 9 and 10 that the doors do not occupy quite one-half of the diameter of the shell, although one-half may be so occupied; but when made as represented in the drawings the stationary portion will be much firmer than if it did not pass the central line.

The width of the door is determined by the diameter of the coils or conduits within the shell.

The top of the shell or body of the generator is provided with a suitable bonnet and stack thereto. The interior of the shell is provided with conduits or coils $x$, mounted or supported upon suitable supporting devices, $w'$, as shown in Fig. 2, 7, 8, and 15, and upon pipe or tubing $l'$, as shown in sectional views, Figs. 2, 8, 9, 15, and in the elevations in Figs. 3 and 7. These pipes project through the shell and are connected by return-bend fittings $e$ in such manner that a free circulation of liquid can be maintained through the series, and as cool liquid is forced through these pipes they cannot become heated to a red heat. Consequently they serve the double purpose of supporting the coils and heating the liquid which may pass through them. These supporting-pipes can continue under each coil or each section of the generator; but as the heat is not great enough to heat the sections above the fifth or sixth lower ones to a red heat, it is not necessary to continue them above the fifth one; but if, when a gas-flame is employed, the flames should fill the coil-chamber or shell, it might be necessary to introduce several more of the supporting-pipes. Those sections which are unsupported by pipes must be kept in position by straps or bars of iron secured to the turns of the coils by clips or other suitable contrivances. A cross-section of these bars or straps $i^3$ is represented in Fig. 8.

The coils or conduits are coiled from pipe which is drawn to the required length, or from short lengths of pipe which are welded at their ends until the required length is obtained. The first or inner turn should be made as small as possible without flattening the pipe. After the section is completed the two ends of the pipe or coil should project tangentially to the inner and outer circles, and parallel, or nearly so, to each other. These projecting ends should be long enough to project through the outer shell and receive suitable fittings thereon. The external projecting end lies within the plane of the coiled section, while the inner end is bent at the commencement of the turn, and after the coil is completed it is heated and bent until it comes in contact with the surface of the coiled section, as shown in Figs. 2 and 15, where it will be observed that one-half of the coiled section rests upon said projecting inner ends.

The coiled section should be made of pipe of different diameters. The section or sections containing pipe of the largest diameter should be placed at the bottom of the series, while the smallest pipe should be at the top. A good rule to adopt in making these sections would be to allow the space between each turn to equal the internal diameter of the pipe. Thus a good and free flue space is obtained. The size or diameter of the pipe should be greater or less, or in accordance with the different diameters of the shells, and also the number of the sections should increase with an increased diameter of the said shells.

The superheating-coil O is located in the fire-box for the purpose of gaining additional heating surface and utilizing heat. The two ends of this coil project through the shell or wall, as shown in Figs. 2, 9, 15, and 16. This coil is shown resting upon the grate-bars. Consequently the complete turns cannot extend below the top of the door F, while the remaining turns are provided with return-bends on each side of said door, whereby a continuous circulation is obtained through the entire length of pipe forming the superheater.

In sectional view, Fig. 2, a fire-brick, $z'$, is shown, which is for the purpose of protecting the bottom of the superheater, and also a lining of asbestus board or of asbestus cement $f^2$ or other material of an analogous nature is introduced between the inner casing or shell and the coils or conduits, whereby protection is given to the shell and radiation retarded.

The ends $r'$ of the external turns of the coiled sections shown in Figs. 1 and 9 are connected by right-and-left couplings $d$ and nipples $c$ to return-bends $b$, while the inner ends, $u'$, with the exception of the upper and lower ends, are connected by right-and-left couplings $w$ and nipples $n'$ to return-bends $i'$. The end of the upper coil, $o'$, is connected by right-and-left couplings to the pipe $o$, which is provided with a check-valve, $j'$, and valve 2, which controls or regulates the flow of the liquid as it is being forced by the pump into the upper conduit, whence it circulates by force through the entire length of said conduit, and is discharged through the lower end, $v'$, coupling $w$, nipple $v$, check-valve $t$, and nipple $u$ into separator H, wherein the steam, vapor, or gas separates from the condensations or from the liquids which may be discharged therein without evolving into steam, vapor, or gas. The separator is kept free from said liquid matter by the trap I, which forces or discharges the liquid through pipe $a'$ into a device whereby it will be returned to the generator for subsequent evaporation. In Fig. 4 a device, C', for this purpose is shown. This device consists of a box or cylinder of suitable size and shape and strong enough to withstand the pressure of the generator, and it is located in the cistern B' and kept constantly filled and surrounded with water or liquid matter. A nipple is screwed into the bottom of this device. To this nipple a T-fitting, $l^6$, is attached, and to the other end thereof a nipple and vertical check-valve, $u^2$, are screwed, while to the outlet of the T-fitting the discharge-pipe $a'$ is affixed.

The induction-pipe $c'$, which is provided with a valve, 5, connects the device C' to the pump, which, when in operation, draws the water or liquids through check-valve $u^2$, cylinder C', and induction-pipe $c'$ and forces it into and through eduction-pipe $o$ into the conduits or coils within the generator, whereby the liquids or water is circulated down through the heated conduits or coils and is discharged in the form of steam, vapor, or gas and liquid into the separator, whence the volatile parts escape to and through pipe K to the dome M, while the liquid matter escapes into the trap and is discharged through pipe $a'$ into the device C', which action closes the vertical check-valve and prevents the liquid in the cistern from entering device C' until the trapped liquid has been discharged therefrom and returned to the generator, after which the check-valve $u^2$ opens and allows the liquids from the cistern to pass to the pump.

The cylinder C' should be of sufficient capacity to hold liquid enough to reduce the temperature of the trapped liquid so it can pass through the pump without eliminating steam, vapor, or gas, which would, if eliminated, cushion the valves and piston and stop the action of the pump.

In Fig. 5 a modification of the above-described device is shown, in which A' represents a coil, through which the liquids flow from the cistern to the pump. The remainder of the connection and the operation are the same as above described.

The dome M (shown in Fig. 2) is supported by braces $k'$, and is provided with the necessary pipes for conducting away steam, vapor, or gas to places of use. The safety device L is connected to pipe P by a suitable fitting, and also the safety device is provided with the blow-off pipe $n$ and a pipe, $m$, which can be used for conducting steam, vapor, or gas to a motor or other required place or places. To the T-fitting $a^5$ the pipe $l$ is attached for conducting steam, vapor, or gas to the force-pump J. The flow through the pipe is controlled by valve 1.

$o^2$ is a T-fitting, to which the induction-pipe $c'$ of the pump is connected, valve 5 being the controlling-valve thereto. The T-fitting is connected to the pump by the nipple $d^5$. To the run of the T a small pipe, $k$, is connected for conducting the products of petroleum or liquid combustibles to the pump, the flow of which is controlled by valve 4, wherefore, by means of the two induction-pipes $c'$ and $k$ and their valves, water and the liquid combustibles can be conducted and drawn into the pump in any proportion required. Thus heating or illuminating gas can be made in the same apparatus at will or as occasion requires; and also, by closing valve 4 with valve 5 remaining open, steam can be generated for any required purpose.

The pressure in the apparatus is indicated by the gage $f$.

The draft to the furnace can be controlled by the damper $g$.

Steam, vapor, or gas is conducted from the dome through pipe $m'$ to the T-fitting $m^2$, which connects to or with the projecting end of the lower turn of the superheater. The flow of the steam, vapor, or gas into said superheater is controlled by valve 12, and the exit thereof is through pipes $s^5$ and $s'$, and the pipe $s^5$ is connected to the superheater by the right-and-left coupling $x^3$, a close nipple, and T-fitting $y^2$. The upper end of the pipe $s^5$ is provided with a T-fitting, $z^2$. To the outlet of this fitting the discharge-pipe $s'$ is connected. This pipe is provided with a plug-cock, 13, for controlling the outflow of the superheated steam or gas.

To the upper end of the T-fitting $z^2$ the conducting-pipe $q$ is attached, while its other end is connected with pipe $m'$ by means of elbows, nipples, and a T-fitting.

The flow in the pipe $q$ is controlled by stopcock 14, the purpose whereof is to convert the superheater into a hot-water circulator or a steam-generator when not employed as a superheater for superheating steam or for the fixation of gas.

The pipe $y$ connects the separator with the superheater O by means of nipples, elbows, and a cross-fitting, $l^2$. The flow of the liquid from the separator to the superheater is controlled by valve 16. A blow-off pipe, $z$, controlled by valve 9, is connected to the cross-fitting $l^2$, which can be employed to drain the superheater and also other connecting-pipes.

The exhaust-pipe $g'$ connects the exhaust-ports to the engine or motor with the cross-fitting $l^2$, whereby the exhaust from the engine is conducted into and through the superheater. Valve 10 is for the purpose of arresting the flow of the exhaust, which passes through the conducting-pipe $g'$, which exhaust then passes through pipe $b'$ on opening valve 6.

The dome M and separator H are connected by pipes $s$ and $i^2$, T's $j^2 k^2$, and nipple $i^5$, Fig. 11, to the trap I, for the purpose of conducting the condensation and liquid not evolved into steam, vapor, or gas away to the device C', whereby it is returned to the generator, as shown in Figs. 1, 2, 3, 4, and 11. The valve 7 is introduced between the trap, dome, and separator for the purpose of stopping the flow of liquid matter when the trap is to be cleaned or any of the parts connected to or with the trap may get out of order. In case this does occur valve 8 can be opened, thereby allowing the trap-liquid to escape to a waste-pipe or to some other place until the repairs are effected.

A glass gage, $i$, with protecting-rods $h$, is attached to the side of the separator H to determine the height of the liquid in said separator. By the aid of the nipple $q^2$ and valves 21, 22, and 23 the overflow can be kept to the height of either one of the valves, and be effectually controlled thereby when connected to the trap, although this discharge can be directly into the atmosphere, but not so effectually controlled as when connected to some trapping device.

In Figs. 11, 12, and 13 a device is shown for exhausting and conducting and forcing the products of combustion into a superheater by means of a jet of steam, vapor, gas, or air, whereby the said products of combustion are decomposed and recomposed with said steam, vapor, or gas, and thence forced out into a furnace or gas-holder or any other place desired. The means consist of the exhaust-pipe Q, which enters the stack just above the dome. The open end of the pipe faces downward, as shown in Fig. 12, while its other end connects with an injector. R', by means of the exhaust-nozzle $v^3$ and $z^3$. The injector may be made in any suitable manner. The one herein shown is provided with a chamber, $w^3$, to which a jet-pipe, $y^3$, is connected, and which is also connected to the dome. The flow through this pipe is controlled by valve 29. The exhaust-pipe Q is connected to the T-fitting R, and thence by means of the nozzle $v^3$ and $z^3$ to the said injector. The flow of the products of combustion is controlled by stop-cock 30, as shown in Fig. 13.

When powdered fuels are to be converted to gas in combination with steam and volatilized liquid combustibles, or with either one separately, the injecting device R' (shown in Fig. 13) or some other device which is analogous thereto may be employed to draw and force the powdered fuels into a heating device, wherein said powdered fuels, steam, and volatilizable liquid combustibles will become decomposed and recomposed and form a fixed gas for illuminating or heating purposes, which can be forced into and through necessary purifiers and thence to a gas-holder for subsequent use; or it may be forced from the generating device into any class of metallurgical furnaces or to any other furnace to which the gas-generating apparatus can be applied.

The powdered fuel U, as shown in Fig. 13, may be placed in a suitable receptacle, T, into which the conducting or exhaust pipe V extends, while its other end projects into T-fitting R. Thus a communication is formed between the receptacle T and the injector R', whereby when force is imparted to the injector the powdered fuel U will be drawn and forced by the current into the superheating device or conduit.

The amount of powdered fuel injected into the heating device is controlled by valve 31.

As the carbonic-acid gas contained in the products of combustion is non-combustible, it becomes necessary to add another equivalent of carbon, which converts said carbonic-acid gas into a carbonic oxide. This conversion can be effected by the addition of carbon in either the liquid or solid form; but when solid it should be in a powdered state when forced into the heating device by an injector, on account of the velocity of the flow of the gas-producing material in heated conduits or coils; but when the products of combustion are forced by steam and volatilized liquid combustibles, or either separately, into retorts, gasogenes, or furnaces, for the production of gas for illuminating or heating purposes, the powdered form of the carbon fuel need not be adhered to, as the above-mentioned devices can be charged with carbonaceous matter in an unpowdered condition.

With the device shown in Fig. 13 it will be observed that a combination of powdered carbonaceous material with the products of combustion can be drawn and forced simultaneously by the injector into the heating device; and, furthermore, as the necessary amount of carbon for carbureting the said products of combustion can be obtained from the powdered material, it will not be necessary to combine liquid combustibles with water for the purpose of carbureting said products of combustion. Therefore the valve 4 on pipe $k$, as shown in Figs. 1, 2, &c., can be closed, thereby allowing only the water to be forced into the conduits, whereby steam is generated for drawing, forcing, and combining with the said products of combustion and powdered carbonaceous material within a heating device, wherein they combine and form a fixed gas.

A part of the stack S is enlarged, as shown in Figs. 11 and 12, for the purpose of allowing a free exit for the products of combustion around the balanced valve $i^3$. This valve, when closed, is seated upon the internal flange, $k^3$. A guiding stem or rod, $m^3$, is secured to the center of the valve and projects through orifices in cross-bars which are connected to flanges $t^3$ and $u^3$. An eye is secured to the guide-stem $m^3$, to which a suitable wire or wire cord is attached and passed over the pulley $n^3$, which is secured to a bracket on the under side of the upper cross-bar. From thence the cord extends to and over the pulley $q^3$, which is suspended from the bracket $s^3$ on the outside of the stack. To the lower end of this cord or wire a suitable weight, $p^3$, is attached, which counterbalances the valve $i^3$ when a pressure is given to the draft; but when the injector is exhausting the products of combustion through pipe Q the valve closes in accordance with the amount of the products of combustion being exhausted. If all of the products are being exhausted, the valve will remain closed and prevent a downward draft of air through the stack into the exhaust-pipe; but if it is desirable that the air should be exhausted in combination with said products of combustion, then the weight $p^3$ can be augmented by an amount sufficient to keep the valve in an elevated position for the admission of said atmosphere, which will require an equivalent of carbon to combine with its oxygen, thus requiring three equivalents for the products of combustion, the atmosphere, and the steam required for injection. The hydrogen of the steam will combine with the nitrogen of the atmosphere and become separated therefrom in the process of purification, thus leaving a pure carbonic oxide, which may be enriched by forcing it, after leaving the purifier and while under pressure, through a closed receiver charged with volatilizable liquid combustibles, wherein the said carbonic-oxide gas becomes combined or mixed therewith and forced out through conducting pipe or pipes into a suitable heated device, wherein a fixed gas is formed for illuminating or heating purposes.

The said carbonic-oxide gas, after being manufactured by the above-described process, can be forced, with or without passing through the purifier, into suitable retorts, gasogenes, or their equivalents, charged with carbonaceous matter, wherein said carbonic-oxide gas becomes carbureted and is conducted therefrom into purifiers, and thence to gas-holders or places of use.

In the vertical sectional view, Fig. 14, a gas-purifier, H′, and holder I′ are shown. The gas is forced from the generator shown in Fig. 1, &c., through pipe $s'$ into pipe $m^4$; thence into and through the perforated funnel $n^4$ in the receiver H′; thence up through the lime-water purifier G′, out through the pipe $o^4$ into the gas-holder I′; thence through pipe $p^4$ into the street-mains.

The flow of the gas into and from the purifier is controlled by valves 37 and 38.

When gas is used in the generator for a fuel a hollow grate, $d^4$, is provided, which may be made in any suitable form or manner. The one shown in Figs. 15 and 16 is spiral in form and perforated for the eduction of gas from its upper surface. The two ends of this coil project through the shell, where one of its ends is connected with an exhaust-pipe, $a^4$, leading from an engine, X, while the other end is provided with a valve for the purpose of blowing off the grate when obstructed by ashes, &c. The pipe $a^4$ is connected to a branch fitting, $e^4$. The two outlets of this fitting $e^4$ are connected to the grate $d^4$ and the superheating-coil O, thus allowing the exhaust to pass through either one or both of said coils.

The flow is regulated by valves 10 and 32. The valve 10 is connected to the branch fitting and coil O by nipples $f^4$ and $g^4$.

The grate $d^4$ can be used to burn wood and coal thereon, and in order to prevent its burning out moist steam or water can be forced therein, the evaporation of which will pass off through the fuel.

The draft to the furnace can be controlled by the register $s^4$, and also, when it is desirable to force the draft, the register should cover the draft-holes $b^2$ and air forced into the ash-pit through the tuyere $r^4$. The base K′ is provided with a door, $k^6$, through which the ashes are taken out.

In the modification, Fig. 17, a different construction of the generator is shown from that seen in Figs. 1, 2, &c., but not differing in principle or operation. It is one of the many forms which may be constructed embodying principles herein shown and described, and which may be suggestive to an intelligent mechanic. The figure represents a longitudinal vertical section of masonry, Z, with a horizontal furnace or chamber in which superheating-coils or conduits O are located, and also a furnace in the rear of said chamber communicating therewith, N being the grate thereto, and $D^2$ the combustion chamber or furnace, which is directly beneath the stack F′. At the throat of the uptake a perforated arch is formed, through which the products of combustion are drawn, and on its upper side the coils $x$ are located. The heat, in passing through the perforations $m^4$, heats the coils and generates steam, vapor, or gas, which is discharged into the separator H, and thence through pipe $m'$ into the outer superheating-coil, O, through pipe $l^4$ into the inner coil, and thence back through pipe $f^5$ to T-fitting $z^2$, where the current divides and flows through pipe $s'$ to a purifier and gas-holder, or directly to furnaces for immediate use. The other division is forced through pipe $k^4$ and tuyere-pipe $i^4$ into the opening $j^4$ in the front end of the masonry. The discharge of gas into the furnace is regulated by valve 35. The forcing-pump J is mounted on the base J′. Water and combustibles are drawn into the pump from pipes $c'$ and $k$ and forced therefrom through pipe $o$ into coil $x$. The condensation in the separator is carried away by means of pipe $i^2$ and trap I.

Fig. 18 is a detail view, showing the connection between the exit-pipe of the superheating-conduit and the hollow perforated grate. This connection is formed for the purpose of conducting gas directly from the superheater O to the furnace where it can be burned. The connection is formed by means of the pipe $g^5$ $h^5$. Valve 39 is employed to control the amount of gas which enters the grate.

All of the parts shown and described in the Figs. 1, 2, 3, 4, 5, 6, 7, 8, 9, 11, 12, 13, 14, 15, 16, and 18 belong to one steam and gas generating apparatus, the principles of which and the construction thereof cannot be fully illustrated otherwise than in detail, as shown.

Having thus fully described the construction of the apparatus, the following will be devoted to a description of the operation thereof and its advantages.

To commence the operation of making gas, water is at first forced into the conduits until three or four of the bottom coils and superheating-coils are filled, which can be determined by the glass gage, after which the fires can be built in the furnace and steam generated for running the pump, which will now force the water through pipe $o$, and thence into pipe $a^3$, and from thence into and through the series of supporting-pipes $l'$, from thence into pipe $e^3$, which joins T-fitting $s^2$, from thence into pipe $o$, from which the said water is discharged into the uppermost of the series of the sectional conduits $x$, wherein it circulates downward against an increasing temperature until it is discharged from one, two, or more of the lower coils into a separator in the form of steam or steam and water. The steam is conducted to the dome M, and from thence to places of use. When steam is being made the water which is separated from the steam in the separator should be kept to a height corresponding with valve 22 for the purpose of furnishing a supply for the superheater, which, when steam is being generated, should perform the functions of a generator, which is done by opening valve 16 in pipe $y$, which connects the separator with the lower coil or induction to the superheater, which is through fitting $l^2$, $m^2$, nipple $h'$, coupling $u^2$ into the end of the coil $f^3$, as shown in Fig. 6. The outlet for the circulating water and steam is through the connections $x^3$ on the end G of the upper coil or turn of the said superheater, close nipple, and T-fitting $y^2$. From thence the circulation is upward through the nipple $s^5$, T $z^2$, controlling-cock 19, pipe $q$, thence through pipe $m'$ into the dome. The water which may be carried over into the dome will return by way of pipe S and be conducted into the separator, or it can be conducted to the trap, as shown in Figs. 1 and 2. Water can also be circulated through the series of supporting-pipes $l'$ in a similar manner, and while the pump is forcing water directly into and through the series of spiral conduits. This operation is effected by opening valve 17 on pipe $l^5$, which connects the separator H with fitting $r^3$ (shown in Figs. 3 and 6) and pipe $a^3$, into the lower supporting-pipe, thence through the series and upward through pipe $p^2$, from which it is discharged into the dome. When the water is forced by the pump into the supporting-pipes valves 17 and 24 must be closed and valve 18 opened, thus allowing the water to be forced directly through pipe $a^3$ into the series of supporting-pipes; thence by closing valve 20 and valve 19 it will pass through pipe $e^3$ into the series of spiral coils or conduits; but when the water is to be forced directly into the series of conduits or spiral coils valve 18 must be closed and valve 24 opened, thus allowing the water to pass through pipe $o$ to the said conduits or spiral coils, while at the same time a free circulation is maintained in the superheater and supporting-pipes.

When gas is to be manufactured by the above-described apparatus the mode of operation will be as follows: In the first place it is better to commence the operation of generating steam before the introduction of the liquid combustibles or the powdered fuel. By this prior operation, which will require but a very few minutes, the generator will be in a better condition to receive the carbon than it would if at first admitted with water. Before admitting the liquid combustibles valve 16 in pipe $y$ must be closed, thus preventing the water from entering the superheater. After the water has escaped from the superheater, stop-cock 14 must be closed, and also valve 17 in pipe $m^5$ and valve 24 on pipe O, while valve 18 on pipe $a^3$ must be opened, and also valve 4 on pipe $k$, whereby combined water and liquid combustibles will be forced through pipe $o$ into pipe $a^3$, from thence into and through the series of supporting-pipes, thence into the series of spiral conduits, wherein the said combined water and liquid combustibles become heated as they circulate downward against an increasing temperature until the combined water and liquid combustibles become evolved into steam, vapor, or gas, and thence discharge into the separator. Heat can be applied to the coils or conduits of sufficient temperature to form a fixed gas therein; but as the process would be slower than to simply convert the water and liquid combustibles to a gaseous condition and then pass it through a subsequent superheating-conduit, it is preferable to adopt the latter mode; and, furthermore, as the gaseous product is discharged into the separator, the matter which may not be evolved will become precipitated and conducted away therefrom by the trap or some other suitable device. Thus the lighter and most volatile parts of the gas-producing material will be utilized. The gas, after leaving the generator, is conducted through pipe $s'$ or connecting-pipes therewith to any point desired.

When the apparatus is used alternately for making gas and steam, as would be the case in factories or other similar places, the regulating-valves for controlling the action of the flow of the currents should be set when the change from gas to steam is made so that a free circulation should be had through the superheater and also the supporting-pipes, and again changed when the manufacture of gas is to succeed the generation of steam.

One very important feature of this gas-generating apparatus is that the pipes or conduits cannot carbonize while the water and liquid combustibles are being forced therein and through them, for the reason that it requires a high degree of heat to convert carbon liquids into a fixed or solid condition, that being the state which they must be in before adhering to the walls of the conduits. Therefore by a continuous agglomeration the conduits are filled with solid carbon; but as the water is combined therewith in the first stages of the operation it must become heated to an equal degree with the liquid carbon in their passage through the conduits. Therefore the degree of heat required to form solid or fixed carbon from liquid carbon will generate superheated steam of an equal degree of heat. Now, as the oxygen of the steam possesses a greater affinity for the carbon than it has for the hydrogen, a decomposition of the steam takes place and a new combination of the carbon and oxygen is effected by virtue of their superior affinity. Consequently when the amount of oxygen in the steam is sufficient to combine with all of the carbon no carbonizing of the pipes can be effected thereby; and, also, the combination of the oxygen and carbon within the pipe protects the interior of the conduits from oxidation. Therefore the conduits will be more enduring when subjected to an equal degree of heat by the use of carbon combined with the water than would be the case were no carbon used. Instead of drawing and forcing powdered carbonaceous material into the superheating-conduit, it can be mixed with the water or liquid combustibles and forced by the pump through the generating-conduits, wherein it will become heated simultaneously with the water or water and liquid combustibles and be formed to a fixed gas for illuminating and heating purposes.

The gas which is generated in the above-described apparatus can be used for motive power to drive engines of all descriptions with. Pipe $l$, leading from the dome, conducts gas to the cylinder of the pump, and is utilized as the force for pumping the combined liquid combustibles into the generator. The exhaust gas from the said cylinder is conducted through an exhaust-pipe to a perforated hollow grate within the furnace, where it is burned as a fuel, or the exhaust gas can be conducted to other places of use, and also other engines can be run by the gas taken from the same device, and the exhaust thereof be conducted to and burned in the furnace and supply the heat to continue the generation of the said gas. The heat required to generate the gas can be furnished from this source alone and without the aid of any other fuel. Therefore it will be practicable to place a generator on the tender of a locomotive and furnish gas to run the said locomotive with and burn the exhaust as a fuel to generate the motive force; also, the same can be said of steamboats and all motors where motive power is required.

By virtue of the high pressure under which the gas is or can be made, it becomes practicable to compress the gas into cylinders for transportation without the aid of pump or pumps or any other compressing device.

This invention is not limited to any number of conduits, or to the size or form thereof, or to the material from which they are constructed; nor is it limited to any particular points or number of points at which the water and liquid combustibles shall enter the said conduits, or to the point or points at which the resulting products shall be discharged therefrom. The variations upon these points indicated above are nearly numberless, and require no inventive genius or mind to suggest and make changes therein; and also the arrangement of all of the external connecting-pipe thereto and therewith can be changed without departing from the fundamental principles underlying the invention and by one who may possess the skill of an ordinary mechanic.

It is not absolutely necessary that all of the pipe and connections should be attached to the generator; but when the preservation of the conduits and a utilization of the heat are required the connections shown in their present or an equivalent form and arrangement should be employed.

When gas is made for motive power a surplus amount should be fixed and stored in a holder or compressed into a cylinder for subsequent use in starting the apparatus on each succeeding day.

One or more pumps can be used to force water or liquid combustibles or soluble or powdered organic or inorganic combustible matter which may be held in solution or suspension into the generator, or a pump for each separately can be used; and also the liquid combustibles can enter the generator at any convenient point thereof, and water or steam be combined therewith in the generating conduits or in the superheater.

Injectors for forcing water and liquid combustibles into the conduits can be used, if desired.

The light products of petroleum can be forced or drawn and injected into the superheating-coil by a jet of steam from the spiral conduits, separator, or steam-dome, wherein said light products—such as naphtha, gasoline, &c.—can be evolved to a fixed gas, if desired, for either heating or illuminating purposes.

As the gas is made under pressure, it can be forced a very long distance through pipes under or above ground and fill gas-holders at remote distances from the gas-generator. Thus a generating apparatus located in one town or city, and also in mining districts, can be used to force gas to another at the distance of miles therefrom, or to force gas into a mine for illuminating and heating purposes, and where water would have to be conveyed long distances to supply the generating apparatus the necessity thereof can be avoided by locating the generator near to the water and forcing the generated product through pipes to the place or places required, where, in case of illuminating purpose, the gas can be stored in a holder, and also, where heat is required for domestic heating purpose, the heating-gas can be stored in holders and used therefrom by conducting through the necessary pipe or pipes to place or places of use; but where power is required the motor can be in direct connection by means of suitable pipe-connections with the generator; and, furthermore, the exhaust gas from said motor can be conducted to and fill a gas holder or holders, from which the gas can be conducted away for various uses.

By the method and means as above set forth a vast saving of labor, time, trouble, and money can be effected by the adoption and use of the herein-described gas-generating apparatus.

It will be observed that a double use of the gas is obtained when first used as a motor and thereafter for heating or illuminating purposes.

The herein-described gas-generating apparatus can be made for household purposes, and when not used for generating gas it can be used for generating steam for motive power and heating purpose, and also it can be used for a hot-water circulator for all places for which it may be required.

The various applications to which the herein-described gas-generating apparatus can be applied I reserve to myself the right to claim in subsequent applications.

What I claim, and desire to secure by Letters Patent, is—

1. A generating coil or conduit having the projecting ends thereof extending through the wall of the furnace tangentially to the inner and outer turns of the coil and the inner end of the coil, and its projection bent down and extending below the bends of the coil and furnishing a support therefor.

2. A series of flat contiguous coils or conduits having suitable end connections uniting all the coils with each other, in combination with the shell of the furnace for the circulation of liquid throughout the series.

3. A series of spiral coils having the outer bends thereof connected by external return-bends and couplings, and also the inner bends thereof connected by return-bends and couplings to form a continuously-connected conduit, whereby a continuous circulation of liquid is secured throughout the series.

4. A series of coils having their ends projecting through the wall of the furnace substantially parallel to each other, and having all their return fittings and couplings outside of the wall of the furnace.

5. In combination with the coils, the hollow supporting pipes or bars passing through the furnace and having suitable end connections, as and for the purpose described.

6. In combination with the supporting hollow bars, the means for causing a circulation of liquid therein, which consists in the stand-pipe H, containing water under pressure, pipe $m^5$, having valve 17, pipe $a^3$, having valve 18, pipe $p^2$, having valve 20, and steam-dome M, operating as described.

7. The furnace containing the generating-coils, constructed with a double shell extending from the base to the bonnet, the outer shell having apertures at the top and the inner shell having apertures at the bottom opening into the ash-pit, in combination with the circular damper $s^4$, for the purpose of utilizing the heat and heating the air supplied to the fuel.

8. The shell of the furnace, having in combination therewith a door or doors extending from the base to the bonnet and nearly one-half of the circumference of the shell, for the purpose of removing and inserting the generating-coils and other internal parts, as described.

9. The double shell of the furnace, in combination with the double shell of the door, in which the inner furnace-shell overlaps the hinge-joint for preventing leakage, as described.

10. In combination with the engine operated by gas or vapors of liquid combustibles, the exhaust-pipe $g'$, having valve 10, and the superheating-coil O, as and for the purpose described.

11. In combination with the superheating-coils, the stand-pipe H, pipe $y$, having valve 16, pipe $s^5$, pipe $q$, having plug-cock 14, pipe $m'$, and the dome M, as and for the purpose described.

12. The means for returning the liquids which are trapped off from the generator to the pump, and thence forcing them again into said generator, which consists of a pipe, $a'$, connected with the generator, the trap I, chamber C', pump E', return-pipe $o$, and the necessary connections and valves, as described.

13. The water-supply pipe $c'$, the oil-supply pipe $k$, and the pump E', in combination with a conducting-pipe, $o$, and a gas-generating apparatus.

14. The process of generating gas which consists in forcing products of combustion from the furnace and carbonaceous material by a combined jet of steam and carbonaceous vapor under pressure through a heated coil or conduit.

15. The process of generating gas which consists in forcing products of combustion and pulverized solid carbonaceous matter by a jet of steam through a heated conduit.

16. The process of generating gas by first converting liquid hydrocarbon and water into vapor or gas, and by a jet of the combined vapor forcing the products of combustion into a heated conduit and converting the mixture into a fixed gas.

17. The pipe Q, connected with the stack, the receptacle T, connecting-pipe V, pipe $g^3$, and the injecting device, in combination with a coil or conduit located in the furnace.

18. The counterbalanced valve $i^3$, provided with a guide-stem, $m^3$, in combination with its seat $k^3$ within the stack, as and for the purpose described.

19. The stack having a counterbalanced valve and seat therefor, as described, in combination with the outlet-pipe Q.

20. The pipe Q, connecting with the stack, the pipe $g^3$ for steam and oil vapor, and the injecting device, in combination with the heating-coils located in the shell.

21. The pipe $g^3$ for steam and oil vapor, the injecting device, the receptacle T for pulverized carbonaceous matter, and a connecting-pipe, in combination with a coil or conduit located in the furnace.

22. The engine and a pipe connected with its exhaust-ports, in combination with the hollow perforated grate $d^4$, located in the base of the generator.

23. In a high-pressure gas-generating apparatus, the hollow perforated grate, in combination with the gas-generating conduits within said high-pressure gas-generating apparatus, for the purpose specified.

WM. FRANK BROWNE.

Witnesses:
WM. APGAR,
T. W. FARNSWORTH.